United States Patent
Kummel

(10) Patent No.: US 6,619,728 B1
(45) Date of Patent: Sep. 16, 2003

(54) SUSPENSION SYSTEM, ESPECIALLY CAB SUSPENSION SYSTEM

(75) Inventor: Albrecht Kummel, Ottweiler (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 10/049,425

(22) PCT Filed: Aug. 10, 2000

(86) PCT No.: PCT/EP00/07762

§ 371 (c)(1),
(2), (4) Date: Feb. 25, 2002

(87) PCT Pub. No.: WO01/12454

PCT Pub. Date: Feb. 22, 2001

(30) Foreign Application Priority Data

Aug. 12, 1999 (DE) .......................................... 199 38 077

(51) Int. Cl.[7] .............................................. B60R 27/00
(52) U.S. Cl. .............................. 296/190.07; 296/190.04
(58) Field of Search ....................... 296/190.04, 190.07; 180/89.13

(56) References Cited

U.S. PATENT DOCUMENTS

| | | | |
|---|---|---|---|
| 2,860,889 A | | 11/1958 | Hanna et al. |
| 3,533,425 A | * | 10/1970 | Hannan |
| 3,836,166 A | | 9/1974 | Bainbridge et al. |
| 3,908,782 A | | 9/1975 | Lang et al. |
| 4,174,016 A | | 11/1979 | Levington et al. |
| 4,483,409 A | * | 11/1984 | Fun |
| 5,044,455 A | * | 9/1991 | Tecco et al. |
| 5,954,149 A | * | 9/1999 | Williams |
| 6,029,764 A | * | 2/2000 | Schubert |
| 6,115,658 A | * | 9/2000 | Ahmadian et al. |

FOREIGN PATENT DOCUMENTS

| | | |
|---|---|---|
| DE | 2848339 | 5/1980 |
| DE | 4324289 | 7/1993 |
| EP | 0424784 | 5/1991 |
| FR | 1298484 | 11/1962 |

* cited by examiner

Primary Examiner—Joseph D. Pape
Assistant Examiner—Scott Carpenter
(74) Attorney, Agent, or Firm—Roylance, Abrams, Berdo & Goodman, LLP

(57) ABSTRACT

A suspension system is for vehicles and its components such as vehicle cabs that at least partially form a load. The components are subject to accelerations in the starting and breaking directions. At least one suspension cylinder can be subject to a load. The fluid chambers of the cylinder are connected to a shock-absorbing device in a fluid conveying manner. The shock-absorbing device counteracts the free movement of the load and throttles the fluid flow linked with it. A sensor device is provided for controlling the shock-absorbing device, and is provided with a control mass that is subject to the accelerations. The sensor device acts upon at least one throttling device in such a way that the fluid flow is increasingly throttled when the acceleration is increasing. The suspension system is improved by the sensor device, next to the user-friendly basic suspension, providing a suspension that is able to guarantee safety even in extreme accelerations and helps to prevent dangerous driving conditions.

15 Claims, 2 Drawing Sheets

SUSPENSION SYSTEM, ESPECIALLY CAB SUSPENSION SYSTEM

FIELD OF THE INVENTION

The present invention relates to a spring suspension system for vehicles and components of such vehicles which at least to some extent constitute loads, such as vehicle cabs, which are subjected to acceleration in the starting and braking directions. At least one suspension cylinder is provided to which a load may be applied. The fluid chambers of the suspension cylinder are connected to a damping mechanism to carry fluid. The damping mechanism regulates the flow of fluid antagonistic to freedom of movement of the load throttles the flow of fluid connected to the load.

BACKGROUND OF THE INVENTION

In the case of service vehicles and other utility vehicles in movement the vehicle occupants are to be shielded from jolts, shaking, and vibrations occurring in travel over rough terrain or are caused by the engine or other assemblies. To counteract these effects, spring suspension systems are conventionally used. Distinctions are made, for example, among individual wheel suspensions, axle suspensions, body suspensions, cab suspensions, and/or seat suspensions.

These conventional spring suspension systems employ a spring element that generates restoring force on a change in position of the mass to be cushioned. The force acts in the direction opposite that of the change in position. If systems which additionally generate a force dependent on the direction and magnitude of the relative velocity are used, reference is made to spring shock absorber systems. In conjunction with any spring elements present and the spring mounted mass, such systems form an oscillatory system designed so that passengers in a vehicle can be suitably protected from shocks and impacts.

A spring suspension system is disclosed in DE 28 48 339 C2. This patent discloses an active mechanical-hydraulic control unit to compensate for changes in the position of land vehicles caused by disturbances and also component systems of this unit. The unit includes an acceleration sensor with inertial mass, actuator, center position control unit, and sequence amplifier. A pilot stage is provided to amplify the signal delivered by the acceleration sensor. Since the actuator, sequence amplifier and center position control unit operating independently of the acceleration sensor are integrated into one structural unit, and since a control orifice to control delivery of the pressure medium to return the actuator to its center position is mounted in the actuator, a system with pressure and throughput yield is obtained and simultaneously is of compact design. The system involves a deflecting plate control in which a stream of oil emerges simultaneously from two triggering nozzles and strikes a deflecting plate. When the body of the sensor moves, the deflecting plate is rotated. The distance from the plates to the edge of the nozzle exit is increased on one side, while this distance is decreased on the other side. Conversely, reduction of the distance results in a smaller oil exit stream and an increase in the distance of a larger oil exit stream in the pilot unit. The oil streams behaving in this manner then act on the controlling edge of the movable piston in the suspension cylinder. Independent choking of the oil streams is not achieved by application of this method. In addition, only changes in the position of the suspension cylinder can be additionally adjusted by application of this approach.

DE 43 24 289 A1 discloses an active suspension of a spring-suspended mass, in a suspension of the driver's cab of a utility vehicle, with actuatable active cylinders between cab and vehicle. This suspension uses vibration energy of another passive or semiactive spring-suspended mass, especially that of the structural suspensions of a utility vehicle, as control energy for actuating the active cylinders of the active suspension. It is expedient in this solution to replace conventional vibration dampers with double-acting differential cylinders mounted in a closed hydraulic circuit of the active spring suspension system. The conventional spring suspension system used for this purpose with actuated active cylinders and valves entails use of a large number of building components in construction. Such building components cause delay determined by the system in application of the damping desired. In addition, even if only one component fails, the operational reliability of the entire system becomes questionable.

SUMMARY OF THE INVENTION

An object of the present invention is to provide improved suspensions by providing a user-friendly basic suspension capable of continuing to ensure reliable damping in the event of extreme acceleration and avoidance of dangerous driving conditions of this nature. Another object of the present invention is to provide a spring suspension system making rapid direct control of damping behavior possible with only a small number of structural components.

To control the damping mechanism, a sensor mechanism is provided having a control mass subject to acceleration and acting on at least one throttle mechanism. Increased throttling of the flow of fluid occurs with an increase in acceleration. Within the flow of oil or fluid, a component with a variable cross-sectional aperture varies the cross-sectional area in the opposite direction as a function of the magnitude of acceleration of the vehicle. In the event of high acceleration an appreciably smaller diameter is available at the throttling point. As a result of this smaller diameter, appreciably greater throttling of the oil and fluid flow is achieved. Independent initiation of throttling of the oil flows in the system with short actuation periods is accordingly made possible.

The control mass makes it possible to achieve rapid throttling of the oil flow as a function of the acceleration acting on the vehicle in or opposite the direction of travel so that the damping force desired is rapidly reached as a function of such acceleration. The present invention is based on purely mechanical and hydraulic principles, which increases reliability in operation. In addition, only a small number of structural components are required for the purpose.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
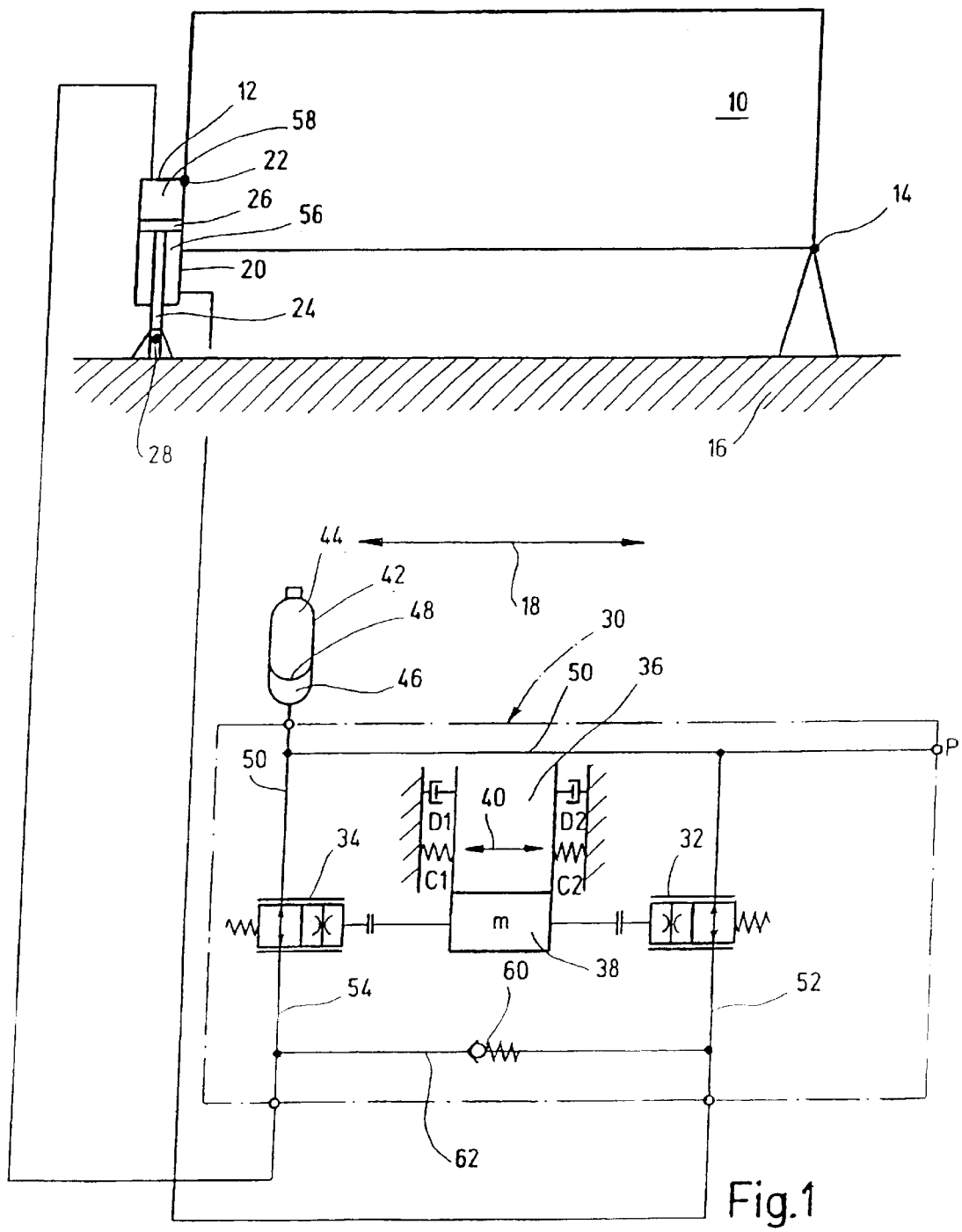
FIG. 1 is a schematic diagram of a spring suspension system for a vehicle cab according to a first embodiment of the present invention.

The spring suspension system conceptionally illustrated in FIG. 1 is provided with a suspension cylinder 12 to which a load in the form of a vehicle cab 10 may be applied. From the viewpoint of driving technology, the behavior of the vehicle cab 10 is such that it is connected in the area of one of its ends by a pivot or moving joint 14 to the vehicle proper 16, especially one in the form of an agricultural machine or an excavator or the like. The principal direction of travel of the vehicle 16 is indicated by a two-way arrow 18 in the figures.

The suspension cylinder 12 is connected to its cylinder housing 20 by another moving joint 22 linked to the vehicle cab 10. The end of the piston rod 24 of the suspension cylinder 12 ends at the piston 26. The other end is swivel-connected by a third moving joint 28 to the vehicle 16. The cylinder housing 20 can follow the movement of the vehicle cab 10 by way of the swivel-connections. Piston rod 24 and piston 26 retain their position relative to the vehicle 16 because of the third swivel connection 28. If the vehicle 16 moves in the plane of the drawing, to the right in the direction indicated by the two-way arrow 18 illustrated in the figures, and abrupt deceleration takes place as a result of a braking process, the vehicle cab 10 pivots clockwise in the accompanying braking process around the swivel point 14, with the cylinder housing 20 connected to the vehicle cab 10 moving with the cab and upward. If acceleration in the opposite direction takes place, for example as a result of starting of the vehicle 16, the vehicle cab 10 pivots in the opposite direction around swivel point 14, that is, counterclockwise, with the cylinder housing 20 connected to the vehicle cab 10 moving in the plane of the drawing downward toward the vehicle 16, as shown in the figures. The accompanying relative acceleration forces occur, in particular, because the vehicle cab 10, with its mass correspondingly, follows the movement of the vehicle 16.

The fluid chambers of the suspension cylinder 12 are connected by lines carrying fluids to a damping mechanism designated by 30 as a complete unit. The damping mechanism throttles the fluid stream between the suspension cylinder 12 and a fluid reservoir so as to counteract the free movement of the load in the form of the suspended cab 10.

Damping mechanism 30 is provided with a throttle device adjustable independently of the path. The throttle device has two proportional throttle valves 32 and 34 in the existing embodiments. For the purpose of actuating the pertinent proportional throttle valve 32 or 34 the damping device is provided with a sensor device detecting acceleration forces. The sensor device has a control mass 38 subject to acceleration. As is indicated by a two-way arrow 40, the control mass 38 can move and/or accelerate in the same direction as the vehicle 16 itself with the vehicle cab 10. The control mass 38 is subject to the action of acceleration, as is shown, and may be returned to its initial position shown in FIG. 1 by a spring system C1 and C2. In order to reduce the sensitivity of the acceleration sensor by the control mass 38, a damping device D1 and D2 is also present in directions of movement opposite each other. The acceleration sensor reacts more or less rapidly to changes taking place in acceleration, as a function of the values selected for the rigidity of the spring and those selected for damping.

In the initial position shown in FIG. 1, the proportional throttle valves 32 and 34 are shown in their switched position and the springiness proper or bias of the vehicle cab suspension 10 is controlled by the hydraulic accumulator 42. In accumulator 42, gas side 44 is separated from the fluid side 46 by a conventional separating agent, for example, one in the form of an elastic separating membrane 48. In the event of small vibratory movements of the vehicle cab 10 about its swivel point 14, the related shock absorption takes place by way of the hydraulic accumulator 42. The gas side is filled preferably with nitrogen and dampens the related shocks. For this purpose the hydraulic accumulator 42 is connected at its fluid side 46, by way of connecting lines 50 and through both throttle valve 32 and throttle valve 34. The throttle valve 32, in turn, is connected by other connecting lines 52 and 54 carrying fluid to the piston rod chamber 56, and from the throttle valve 34 to the piston chamber 58 of the suspension cylinder 12.

In addition, the connecting lines 50 are connected to a fluid supply reservoir P permitting, for example, providing conventional determination of a level for the vehicle or making temperature and weight adjustments. For example, if an operator enters the cab, thereby increasing the operating weight of the vehicle, a weight adjustment can be made. If these provisions are unnecessary, the fluid supply reservoir P can be eliminated and the system operated as a closed one. Specifically, the amounts of fluid present in the system, by way of the throttling mechanisms and use the hydraulic accumulator 42, would then move back and forth between the fluid chambers of the suspension cylinder 12 on the basis of the state of movement of the vehicle. Since the piston chamber 58 has a larger volume of fluid available to it than does the associated piston rod chamber 56, between the two connecting lines 52 and 54, a return valve 60 opens in the direction of the piston rod chamber 56 and is connected to a line 62 between the connecting lines 52 and 54. When the cylinder is extended, the displacement volume on the ring side is controlled by the throttle 32 and thus moderated.

The spring suspension system of the present invention will now be explained in detail with reference to the operation of the system. If the vehicle system is not subject to any abrupt acceleration, the damping mechanism 30 is essentially at rest, with both proportional throttle valves 32 and 34 are in their switched positions as illustrated. The hydraulic accumulator 42 assumes the function of basic suspension in this rest condition, with the gas side 44 buffering the suspension shocks due to displacement of fluid between rod chamber 56 and piston chamber 58 of the suspension cylinder 12. If acceleration now occurs, for example as a result of a braking process, the vehicle cab 10 must, because of its inertial mass relative to the vehicle 16, strive or tend to move clockwise about the pivot point 14. In the process the cylinder housing 20 as well moves upward, so that the fluid volume of the rod chamber 56 decreases, while that of the piston chamber 58, which is separated from the piston rod chamber 56 by the piston 26, correspondingly increases.

In addition, the control mass 38 of the damping system 30, which is preferably connected to the vehicle 16, moves to the right in FIG. 1, in the direction opposite that of the appropriate parts of spring damping system C1, C2; D1, D2, so that the quantity of fluid directed or conveyed from the piston rod chamber 56 by way of the additional connecting line 52 is throttled in the direction of connecting line 50. In the process the proportional throttle valves 32 and 34 are designed so that throttling increases constantly the greater the extent to which these throttle valves are acted upon by way of the control mass 38. Since the proportional throttle valve 34 remains in its full transmission position as illustrated in FIG. 1 during braking, throttling is effected exclusively by way of the valve 32. The quantity of fluid throttled in this manner may flow through the switched proportional throttle valve 34 by way of the connecting line 50 and the other connecting line 54 in the direction of the piston chamber 58 of the suspension cylinder 12. As a result of this damping by the proportional throttle valve 32, a damping or suspension response is superimposed on the customary suspension based on acceleration, permitting a definite state of the system between vehicle cab 10 and vehicle 16, even in the event of extreme braking acceleration.

If acceleration occurs in the other direction, as during a vehicle start, under the influence of inertia the vehicle cab 10 remains behind relative to the vehicle 16. The volume of fluid decreases on the piston chamber 58 side. Since the control mass 38 is then displaced in the opposite direction, to the left as indicated by the two-way arrow 40 in FIG. 1, the valve 32 remains in the switched position and throttling of the proportional throttling valve 34 is effected with increasing acceleration by throttling means. Again, harmful acceleration is counteracted as a result by means of damping. The higher the acceleration and deceleration values, the greater the extent to which the control mass 38 is moved and the greater the extent to which the free cross-sectional area of the valves 32 or 34 is reduced. In this manner, variable damping increases and the deflection movement of the vehicle cab 10 is counteracted.

The action of the spring damping system C1, C2, D1, and D2 ensures that the control mass 38 will not vibrate, and will return to the initial position when the speed of travel is uniform, so that the two valves 32 and 34 return to their switched free-passage position as illustrated in FIG. 1. Spring elements of the valves 32 and 34 support the related movement of return to the initial spring position.

Figure 2:
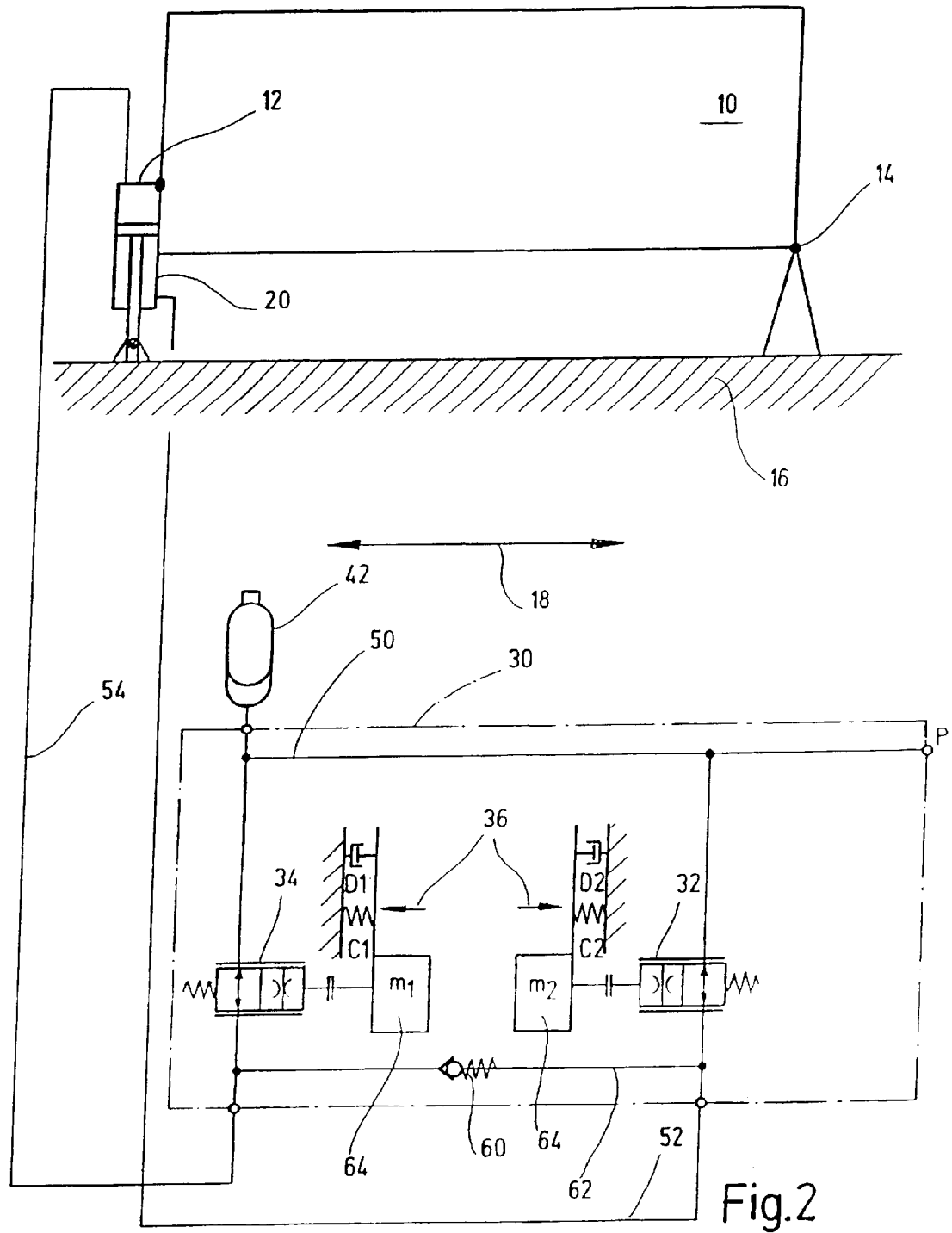
FIG. 2 is a schematic diagram of a spring suspension system for a vehicle cab according to a second embodiment of the present invention.

The embodiment shown in FIG. 2 corresponds more or less to the embodiment illustrated in FIG. 1, so that the same reference symbols are employed for the same components. The foregoing deceleration also applies to the common components of the embodiment shown in FIG. 2.

The embodiment illustrated in FIG. 2 differs from that of FIG. 1 in that the control mass 38 of the first embodiment is divided into two partial control masses m1, m2. If both partial control masses 64 are designed to be the same in point of mass, essentially no behavior differs from that of the spring suspension system illustrated in FIG. 1. Preferably, however, the partial control masses 64 are designed to be different, for example in that the partial control mass 64 designated as m2 is designed to be heavier or greater than the partial control mass 64 designated as m1. During deceleration, the mass m2 exerts greater effect and executes increased throttling by way of the proportional throttle valve 32. Different suspension values may accordingly be assigned to the suspensions with respect to acceleration and deceleration.

For example, level control for the vehicle 16 may be performed, or the temperature and weight conditions assigned to the system may be adjusted, by an additional control device, by way of fluid supply reservoir P. Keeping the cab 10 in a more or less horizontal position in the event of extreme inclination of the vehicle 16, in order to make conditions more comfortable for the operator by adjusting the suspension cylinder 12, is also allowed.

The spring suspension system of the present invention does not require a compromise between soft suspension for driving and hard damping to prevent bottoming into the end bearing of a vehicle, for example, under extreme acceleration and deceleration conditions, in which high negative or positive acceleration values occur. Application of the spring suspension system on the other hand provides a pleasant basic suspension on which adjusted damping is superimposed under the extreme driving conditions indicated. The adjustment processes involved taking place very rapidly.

While various embodiments have been chosen to illustrate the invention, it will be understood by those skilled in the art that various changes and modifications can be made therein without departing from the scope of the invention as defined in the appended claims.

What is claimed is:

1. A spring suspension system for vehicles or components thereof constituting loads subject to acceleration in a starting direction and a deceleration in braking direction, comprising: at least one load receiving suspension cylinder having first and second fluid chambers separated by a piston;

a dampening mechanism having first and second adjustable throttle valves and being connected to said fluid chambers by fluid conveying lines to restrict fluid flow therein to dampen the motion of the load;

a sensor coupled to and actuating said dampening mechanism, said sensor having a control mass subject to acceleration and mechanically coupled to said first and second throttle valves to increase throttling of the fluid flow therethrough with increased deceleration and acceleration, respectively; and a hydraulic accumulator in fluid communication with and acting on said fluid chambers when said throttle valves are not actuated to provide a primary suspension.

2. A spring suspension system according to claim 1 wherein
said valves are proportional throttle values.

3. A spring suspension system according to claim 2 wherein
said control mass is coupled directly to and actuates said valves directly; and
a spring damper is coupled to said control mass.

4. A spring suspension system according to claim 3 wherein
said first and second throttle valves are in fluid communication with said first and second fluid chambers, respectively.

5. A spring suspension system according to claim 1 wherein
said control mass is coupled directly to and actuates said valves directly; and
a spring damper is coupled to said control mass.

6. A spring suspension system according to claim 5 wherein
said first and second throttle valves are in fluid communication with said first and second fluid chambers, respectively.

7. A spring suspension system according to claim 1 wherein
a vehicle cab is pivotably connected to a vehicle by at least one pivot connection; and
said cylinder having a housing pivotably connected to said cab-and a piston rod pivotably coupled to said vehicle.

8. A spring suspension according to claim 7 wherein
said throttle valves are connected to one another in a direction toward said cylinder in fluid communication by a connecting line, said connecting line having a return valve therein opening in a direction of said first fluid chamber.

9. A spring suspension according to claim 8 wherein
said dampening mechanism is in fluid communication with a fluid supply reservoir.

10. A spring suspension system according to claim 8 wherein
said control mass comprises separate first and second partial control masses directly connected to said first and second throttle valves, respectively.

11. A spring suspension system according to claim 7 wherein
said control mass comprises separate first and second partial control masses directly connected to said first and second throttle valves, respectively.

12. A spring suspension according to claim 1 wherein
said throttle valves are connected to one another in a direction toward said cylinder in fluid communication by a connecting line, said connecting line having a return valve therein opening in a direction of said first fluid chamber.

13. A spring suspension according to claim 12 wherein
said dampening mechanism is in fluid communication with a fluid supply reservoir.

14. A spring suspension according to claim 1 wherein
said dampening mechanism is in fluid communication with a fluid supply reservoir.

15. A spring suspension system according to claim 1 wherein
said control mass comprises separate first and second partial control masses directly connected to said first and second throttle valves, respectively.

* * * * *